US012634929B2

(12) United States Patent
Wang et al.

(10) Patent No.: US 12,634,929 B2
(45) Date of Patent: May 19, 2026

(54) UPLINK TRANSMISSION SWITCHING FOR INTRA-BAND NONCONTIGUOUS UPLINK CARRIER AGGREGATION

(71) Applicant: Apple Inc., Cupertino, CA (US)

(72) Inventors: Fucheng Wang, Cupertino, CA (US); Anatoliy S Ioffe, Sunnyvale, CA (US); Ankit Bhamri, Haar (DE); Haitong Sun, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 296 days.

(21) Appl. No.: 18/370,230

(22) Filed: Sep. 19, 2023

(65) Prior Publication Data

US 2024/0406954 A1 Dec. 5, 2024

Related U.S. Application Data

(60) Provisional application No. 63/469,732, filed on May 30, 2023.

(51) Int. Cl.
H04L 5/00 (2006.01)
H04W 72/1268 (2023.01)

(52) U.S. Cl.
CPC ......... H04W 72/1268 (2013.01); H04L 5/001 (2013.01)

(58) Field of Classification Search
CPC ........................... H04W 72/1268; H04L 5/001
See application file for complete search history.

(56) References Cited

U.S. PATENT DOCUMENTS

| | | | |
|---|---|---|---|
| 10,980,035 B2 | 4/2021 | Ioffe | |
| 2022/0039092 A1* | 2/2022 | Raghavan | ............... H04L 5/001 |
| 2022/0070891 A1* | 3/2022 | Nam | .................... H04L 27/2602 |
| 2023/0232420 A1* | 7/2023 | Babaei | ................ H04W 72/232 |
| | | | 370/329 |
| 2025/0253989 A1* | 8/2025 | Takahashi | ......... H04W 72/0453 |

OTHER PUBLICATIONS

3GPP Draft, vol. RAN WG4, 2019, HUAWEI et al, "On intra-band NC UL CA for FR2" URL: https://www.3gpp.org/ftp/tsg ran/WG4 Radio/TSGR4 92Bis/Docs/R4-1912401.zip Section 2.2; pgs.

(Continued)

*Primary Examiner* — Kent Krueger
(74) *Attorney, Agent, or Firm* — FLETCHER YODER PC

(57) ABSTRACT

A wireless communication network schedules multiple components carriers on a same frequency band to user equipment (UE) for transmitting wireless signals. The network may indicate to the UE when to use each carrier, and the UE my switch between transmitting on each carrier. The UE may transmit multiple different signals on each carrier. In particular, the UE may include a local oscillator (LO) that generates a first frequency of a first carrier, and couple the LO to the transmission paths when transmitting using the first carrier. The UE may then cause the LO to generate a second of a second carrier, and couple the LO to the transmission paths when transmitting using the second carrier. Additionally or alternatively, the UE may include a second LO that generates the second frequency, and couple the second LO to the transmission paths when transmitting using the second carrier.

20 Claims, 7 Drawing Sheets

(56) References Cited

OTHER PUBLICATIONS

3GPP Draft, vol. RAN WG4, 2019, Apple Inc, "Carrier switching to enable non-simultaneous transmission for intra-band non-contiguous UL CA in FR2"; URL: http://www.3gpp.org/ftp/tsg ran/WG4 Radio/TSGR4 92Bis/Docs/R4-1911512.zip figure 2, Section 2.1; pgs.

Combined Search and Examination Report for Great Britain Patent Application No. GB2407302.5 dated Jan. 17, 2025; 9 pgs.

* cited by examiner

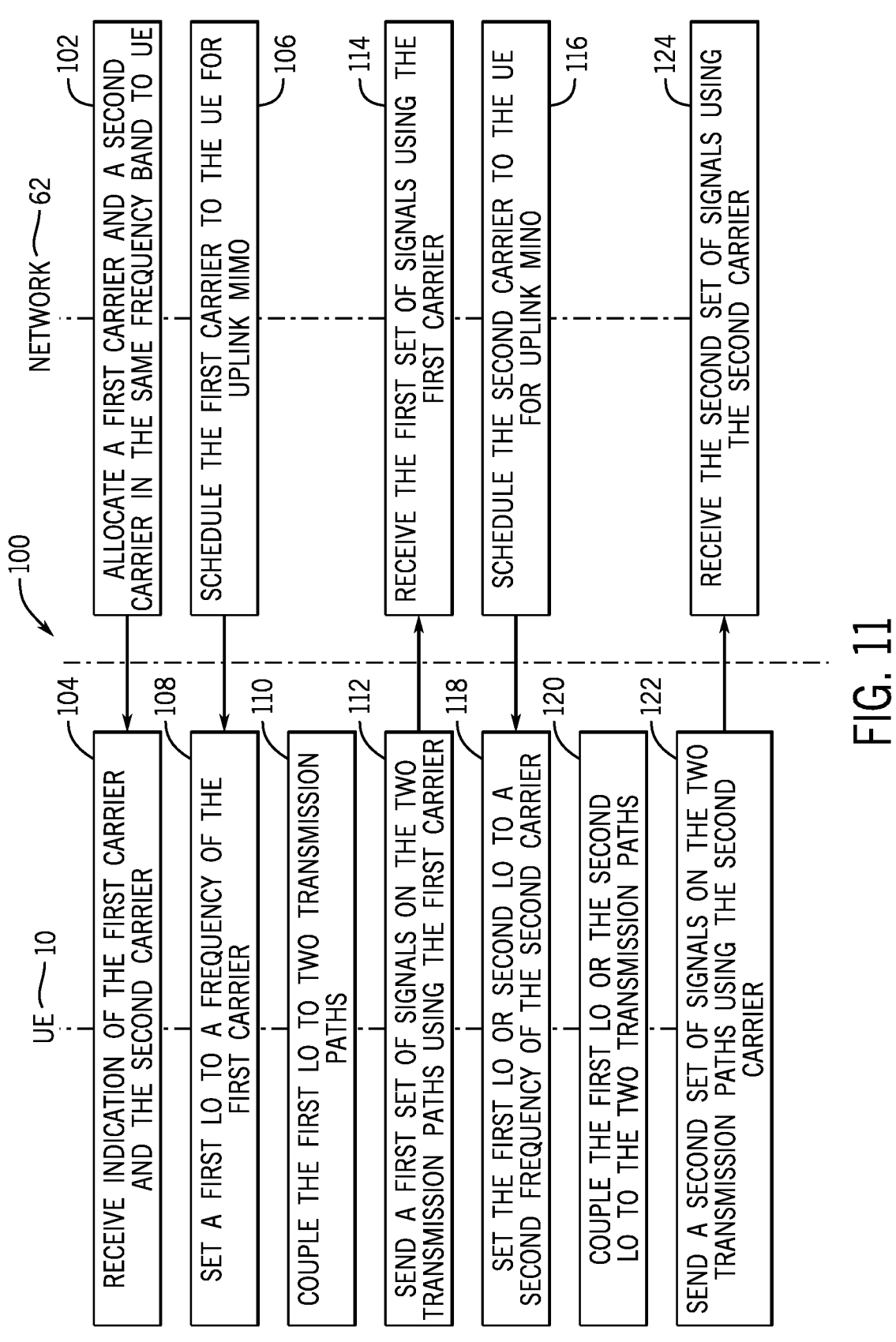

NETWORK—62

ALLOCATE A FIRST CARRIER AND A SECOND CARRIER IN THE SAME FREQUENCY BAND TO UE — 102

SCHEDULE THE FIRST CARRIER TO THE UE FOR UPLINK MIMO — 106

RECEIVE THE FIRST SET OF SIGNALS USING THE FIRST CARRIER — 114

SCHEDULE THE SECOND CARRIER TO THE UE FOR UPLINK MIMO — 116

RECEIVE THE SECOND SET OF SIGNALS USING THE SECOND CARRIER — 124

100

UE—10

RECEIVE INDICATION OF THE FIRST CARRIER AND THE SECOND CARRIER — 104

SET A FIRST LO TO A FREQUENCY OF THE FIRST CARRIER — 108

COUPLE THE FIRST LO TO TWO TRANSMISSION PATHS — 110

SEND A FIRST SET OF SIGNALS ON THE TWO TRANSMISSION PATHS USING THE FIRST CARRIER — 112

SET THE FIRST LO OR SECOND LO TO A SECOND FREQUENCY OF THE SECOND CARRIER — 118

COUPLE THE FIRST LO OR THE SECOND LO TO THE TWO TRANSMISSION PATHS — 120

SEND A SECOND SET OF SIGNALS ON THE TWO TRANSMISSION PATHS USING THE SECOND CARRIER — 122

FIG. 11

UPLINK TRANSMISSION SWITCHING FOR INTRA-BAND NONCONTIGUOUS UPLINK CARRIER AGGREGATION

CROSS-REFERENCE TO RELATED APPLICATIONS

This application claims the benefit of U.S. Provisional Application No. 63/469,732, filed May 30, 2023, entitled "UPLINK TRANSMISSION SWITCHING FOR INTRA-BAND NONCONTIGUOUS UPLINK CARRIER AGGREGATION," which is hereby incorporated by reference in its entirety for all purposes.

BACKGROUND

The present disclosure relates generally to wireless communication, and more specifically to increasing uplink transmission throughput.

A wireless communication network, such as a cellular network, may schedule user equipment for uplink transmission switching on multiple inter-band carriers (e.g., two component carriers that are not in the same frequency band). That is, the network may enable the user equipment to transmit wireless signals on a first component carrier on a first frequency band, and switch to transmitting wireless signals on a second component carrier on a second frequency band. In either case, the user equipment may use uplink multiple-input and multiple-output (MIMO)—multiple (e.g., at least two) transmission paths to transmit multiple (e.g., at least two) different signals (e.g., concurrently or simultaneously) on a single component carrier using multiple (e.g., at least two) different antennas (e.g., via spatial diversity). However, the network may not schedule the user equipment multiple intra-band carriers for uplink transmission switching.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

In one embodiment, a method includes receiving an indication of a first carrier and a second carrier in a same frequency band, configuring a first local oscillator to generate a first frequency of the first carrier, and transmitting a first set of signals using a plurality of transmission paths using the first carrier. The method also includes configuring the first local oscillator or a second local oscillator to generate a second frequency of the second carrier, and transmitting a second set of signals using the plurality of transmission paths using the second carrier.

In another embodiment, user equipment includes a first transmission path having a first mixer; a second transmission path having a second mixer, a local oscillator coupled to the first mixer and the second mixer, and processing circuitry coupled to the first transmission path, the second transmission path, and the local oscillator. The processing circuitry is configured to receive an indication of a first carrier and a second carrier in a same frequency band, configure the local oscillator to generate a first frequency of the first carrier, cause the first transmission path to transmit a first signal the first carrier, and cause the second transmission path to transmit a second signal using the first carrier. The processing circuitry is also configured to cause the first transmission path to transmit a third signal using the first transmission path and the second carrier, and cause the second transmission path to transmit a fourth signal using the second carrier.

In yet another embodiment, tangible, non-transitory, computer-readable media stores instructions that cause processing circuitry to allocate a first carrier and a second carrier in a same frequency band to user equipment, schedule the user equipment to use the first carrier to transmit a first plurality of signals using a plurality of antennas, and receive the first plurality of signals. The instructions also cause the processing circuitry to schedule the user equipment to use the second carrier to transmit a second plurality of signals using the plurality of antennas, and receive the second plurality of signals.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings described below in which like numerals refer to like parts.

FIG. 11 is a flowchart of a process for uplink transmission switching between the first and second component carriers of FIG. 6 allocated in an intra-band noncontiguous uplink carrier aggregation scheme, according to embodiments of the present disclosure.

DETAILED DESCRIPTION OF SPECIFIC EMBODIMENTS

Figure 1:
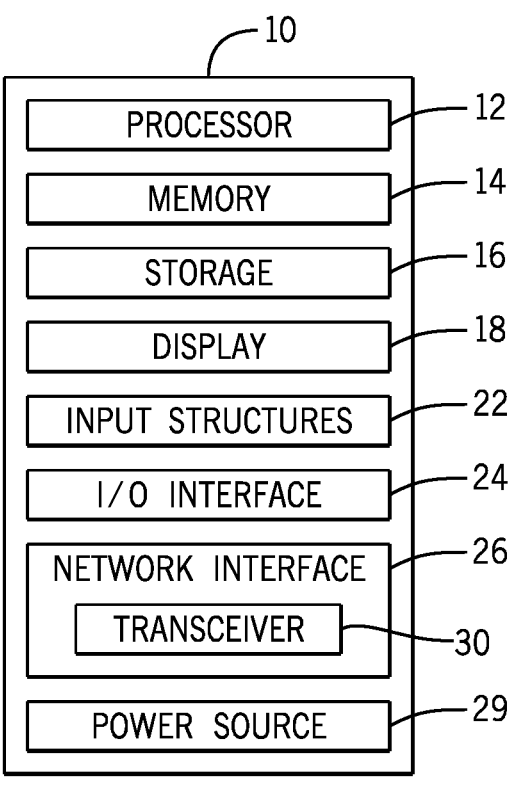
FIG. 1 is a block diagram of user equipment, according to embodiments of the present disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the terms "approximately," "near," "about," "close to," and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on). Moreover, it should be understood that any exact values, numbers, measurements, and so on, provided herein, are contemplated to include approximations (e.g., within a margin of suitable or contemplatable error) of the exact values, numbers, measurements, and so on. Additionally, the term "set" may include one or more. That is, a set may include a unitary set of one member, but the set may also include a set of multiple members.

This disclosure is directed to enabling a wireless communication network to schedule multiple (e.g., at least two) components carriers on a same frequency band (e.g., intra-band carriers) to user equipment for transmitting wireless signals. Moreover, the network may indicate to the user equipment when to use each carrier, and the user equipment my switch between transmitting on each carrier. Additionally, the user equipment may use uplink multiple-input and multiple-output (MIMO)—multiple (e.g., at least two) transmission paths to transmit multiple (e.g., at least two) different signals (e.g., concurrently or simultaneously)—on each carrier (e.g., using multiple different antennas via spatial diversity).

In particular, the user equipment may include a local oscillator that generates a first frequency associated with a first carrier, and couple the local oscillator to multiple (e.g., at least two) transmission paths when transmitting using the first carrier. The user equipment may then cause the local oscillator to generate a second frequency associated with a second carrier, and couple the local oscillator to the multiple transmission paths when transmitting using the second carrier. Additionally or alternatively, the user equipment may include a second local oscillator that generates the second frequency associated with the second carrier, and couple the second local oscillator to the multiple transmission paths when transmitting using the second carrier. Advantageously, the user equipment may use the same radio resource control (RRC) configuration (e.g., not require RRC reconfiguration) when switching between the two carriers, since there may be no change in primary cell and/or secondary cell designation.

FIG. 1 is a block diagram of user equipment 10 (e.g., an electronic device), according to embodiments of the present disclosure. The user equipment 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the user equipment 10.

By way of example, the user equipment 10 may include any suitable computing device, including user equipment, a desktop or notebook computer, a portable electronic or handheld electronic device such as a wireless electronic device or smartphone, a tablet, a wearable electronic device, and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the user equipment 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the user equipment 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the user equipment 10 to provide various functionalities.

In certain embodiments, the display 18 may facilitate users to view images generated on the user equipment 10. In some embodiments, the display 18 may include a touch screen, which may facilitate user interaction with a user interface of the user equipment 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the user equipment 10 may enable a user to interact with the user equipment 10 (e.g., pressing a button to increase or decrease a volume level). The I/O interface 24 may enable user equipment 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FI®), and/or a wide area network (WAN), such as any standards related to the Third Generation Partnership Project (3GPP), including, for example, a 3$^{rd}$ generation (3G) cellular network, universal mobile telecommunication system (UMTS), 4$^{th}$ generation (4G) cellular network, long term evolution (LTE®) cellular network, long term evolution license assisted access (LTE-LAA) cellular network, 5$^{th}$ generation (5G) cellular network, and/or New Radio (NR) cellular network, a satellite network, a non-terrestrial network, and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the user equipment 10 may allow communication over the aforementioned networks (e.g., 5G, Wi-Fi, LTE-LAA, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth. The power source 29 of the user equipment 10 may include any suitable source of power, such as a rechargeable lithium polymer (Li-poly) battery and/or an alternating current (AC) power converter.

Figure 2:
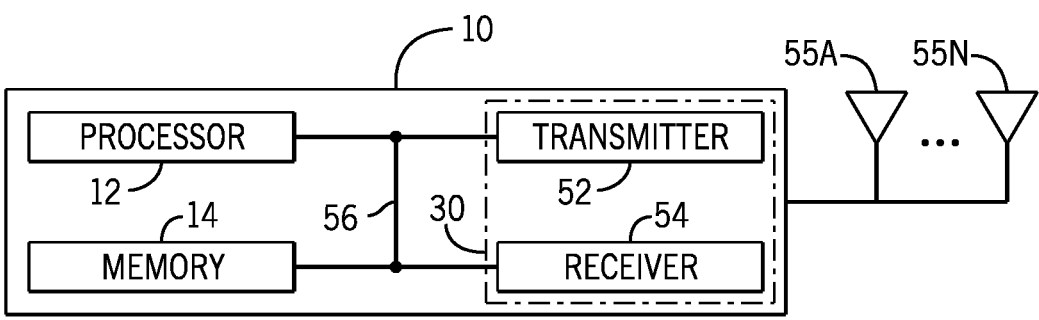
FIG. 2 is a functional diagram of the user equipment of FIG. 1, according to embodiments of the present disclosure.

FIG. 2 is a functional block diagram of the user equipment 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The user equipment 10 may include the transmitter 52 and/or the receiver 54 that respectively enable transmission and reception of data between the user equipment 10 and an external device via, for example, a network (e.g., including base stations) or a direct connection. As illustrated, the transmitter 52 and the receiver 54 may be combined into the transceiver 30. The user equipment 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with one or more beams and various configurations. In some embodiments, multiple antennas of the antennas 55A-55N (e.g., of an antenna group or module) may be communicatively coupled a respective transceiver 30 and each emit radio frequency signals that may constructively and/or destructively combine to form a beam. The user equipment 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the user equipment 10 may be coupled together by a bus system 56. The bus system 56 may include a data bus, for example, as well as a power bus, a control signal bus, and a status signal bus, in addition to the data bus. The components of the user equipment 10 may be coupled together or accept or provide inputs to each other using some other mechanism.

Figure 3:
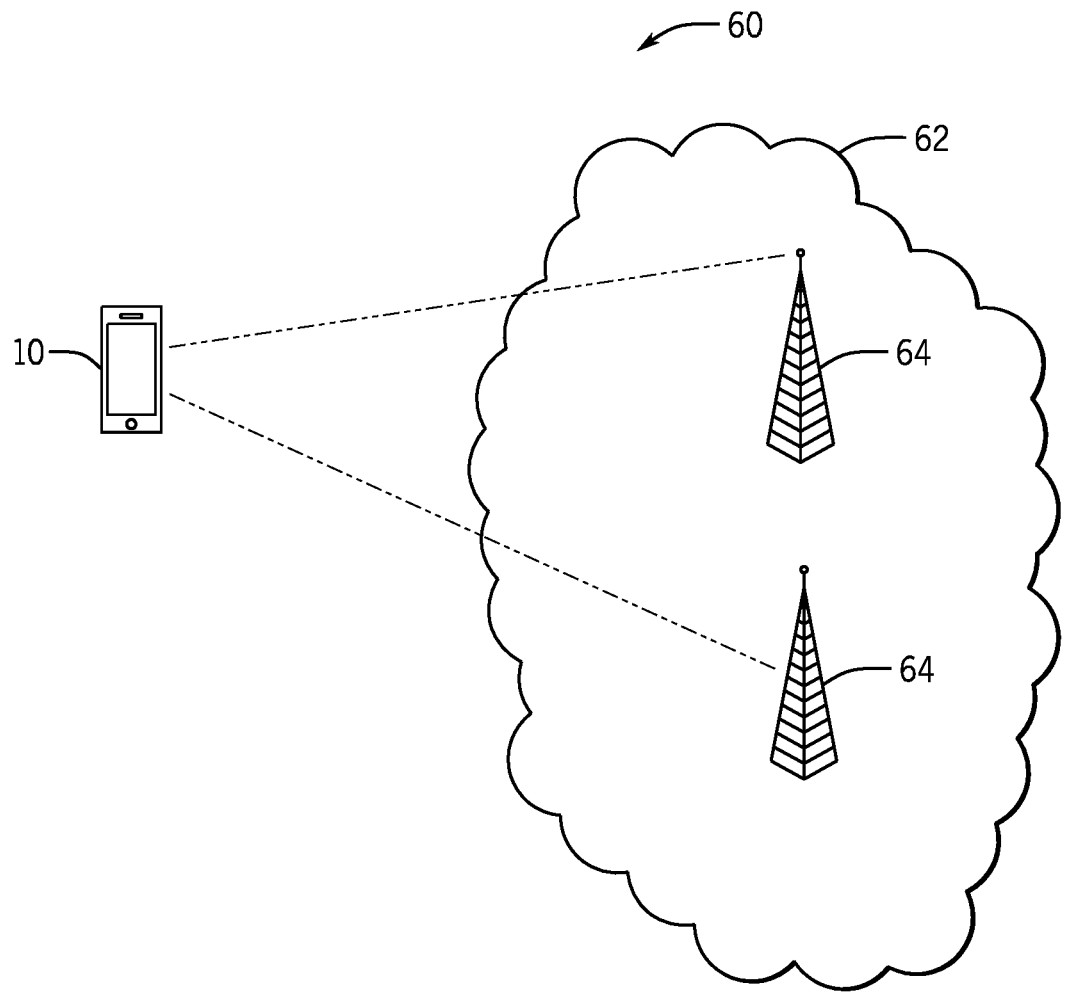
FIG. 3 is a schematic diagram of a communication system including the user equipment of FIG. 1 communicatively coupled to a wireless communication network supported by base stations, according to embodiments of the present disclosure.

FIG. 3 is a schematic diagram 60 of a wireless communication network 62 supported by one or more base stations 64 and including the user equipment 10 of FIG. 1, according to embodiments of the present disclosure. In particular, the one or more base stations 64 may include Evolved NodeB (eNodeB) base stations that may provide 4G/LTE coverage via the wireless communication network 62 to the user equipment 10, Next Generation NodeB (gNodeB or gNB) base stations that may provide 5G/New Radio (NR) coverage via the wireless communication network 62 to the user equipment 10, or any other suitable base stations that provide any suitable radio access technology (e.g., such as 6G, beyond 6G, and so on) coverage via the wireless communication network 62 to the user equipment 10. Each of the user equipment 10 and the one or more base stations 64 may include at least some of the components of the user equipment 10 shown in FIGS. 1 and 2, including one or more processors 12, the memory 14, the storage 16, the transmitter 52, the receiver 54, and the associated circuitry shown in FIG. 4.

In some user equipment, including the user equipment 10, uplink transmission switching may be performed, for example, to enhance inter-band E-UTRAN New Radio-Dual Connectivity (EN-DC), inter-band uplink (UL) carrier aggregation (CA), supplementary UL (SUL) operations, and so on. Such switching may occur between two uplink carriers in two different frequency bands. It should be understood that frequency bands, as referred to herein, includes those frequency bands as defined by any suitable wireless communications standard, such as those set forth by the International Telecommunication Union (ITU), the 3GPP, or the like.

Figures 4, 5:
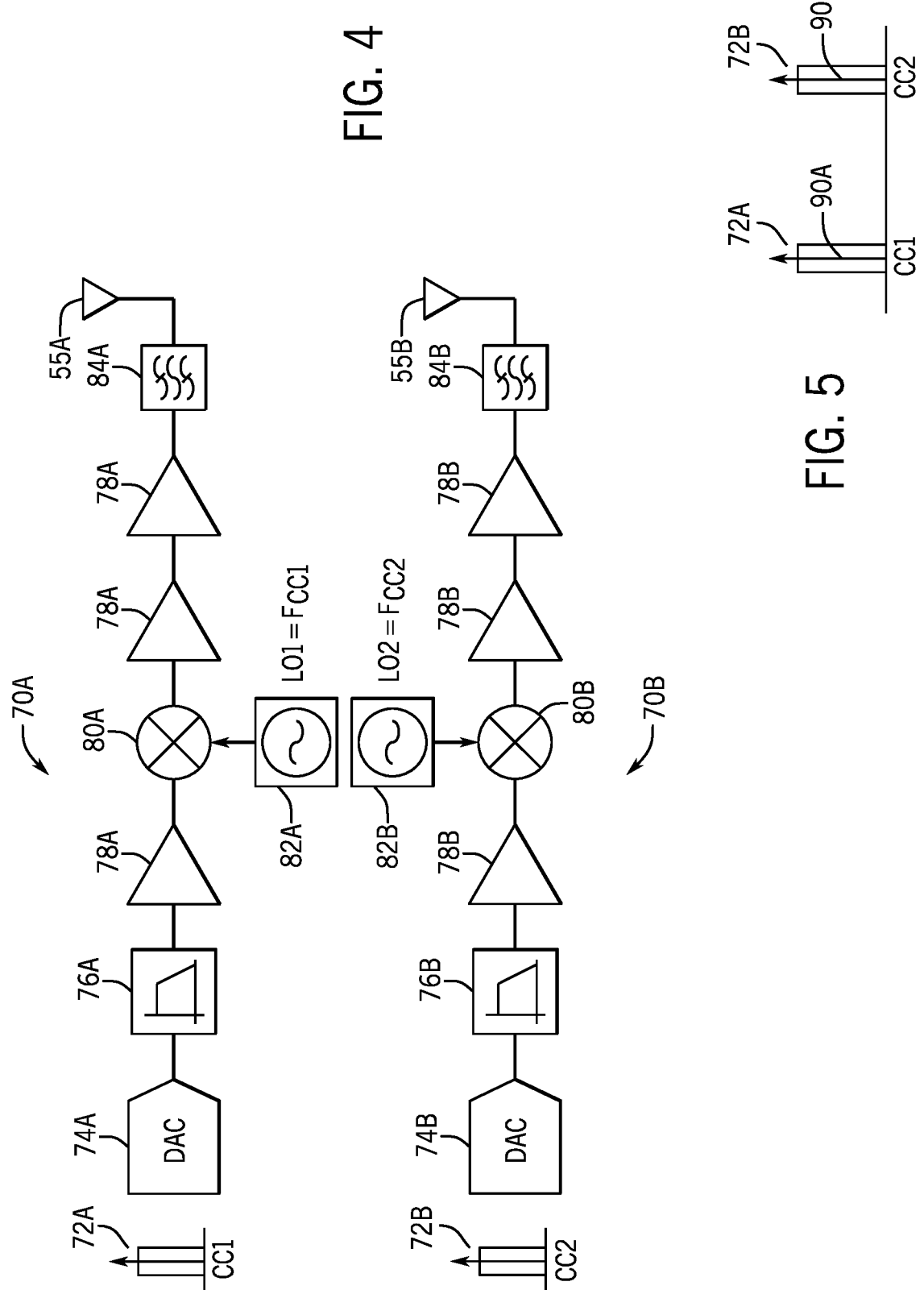
FIG. 4 is a schematic diagram of a first transmission path of the user equipment of FIG. 1 using a first component carrier, and a second transmission path of the user equipment of FIG. 1 using a second component carrier, according to embodiments of the present disclosure.
FIG. 5 is a frequency diagram illustrating the first and second component carriers of FIG. 4, according to embodiments of the present disclosure.

FIG. 4 is a schematic diagram of a first transmission path 70A of the user equipment 10 using a first component carrier 72A, and a second transmission path 70B of the user equipment 10 using a second component carrier 72B, according to embodiments of the present disclosure. In particular, the first transmission path 70A may include components of a first transmitter 52 (e.g., a first front-end of the first transmitter 52) of the user equipment 10 operably coupled to a first antenna 55A, and the second transmission path 70B may include components of a second transmitter 52 (e.g., a second front-end of the second transmitter 52) of the user equipment 10 operably coupled to a second antenna 55B. As illustrated, each of the transmission paths 70A, 70B respectively include a digital-to-analog converter (DAC) 74A, 74B that may convert an input digital signal to an output analog signal, an analog baseband filter 76A, 76B that may filter undesirable noise from an input signal, one or more amplifiers (e.g., power amplifiers) 78A, 78B that may amplify or increase power an input signal to facilitate transmitting a wireless signal from a respective antenna 55A, 55B, a mixer 80A, 80B that combines an input signal with a respective local oscillation signal LO1, LO2 provided by a respective local oscillator or synthesizer 82A, 82B (LO) to generate an output signal having a desired frequency, and a radio frequency (RF) band filter 84A, 84B that may filter out-of-band components of an input signal to generate an output signal having desired components in a desired frequency range.

The processor 12 may cause a transmission path 70A, 70B to transmit a wireless signal having a frequency of a carrier by causing an LO 82A, 82B to generate an output signal having the frequency of the carrier, which is then mixed, via a mixer 80A, 80B, to an input signal (e.g., having a baseband frequency). Depending on frequency separation between the two carriers 72A, 72B, the user equipment 10 may include, as illustrated, two transmission paths 70A, 70B each having a respective LO 82A, 82B and at least one power amplifier 78A, 78B.

For example, the network 62 may assign a first carrier 72A and a second carrier 72B to the user equipment 10. In some embodiments, the first carrier 72A may be of a first frequency band and the second carrier 72B may be of a second frequency band (e.g., different than and/or not overlapping with the first frequency band). The carriers 86A, 86B may FIG. 5 is a frequency diagram illustrating the first and second component carriers 72A, 72B, according to embodiments of the present disclosure. The processor 12 may cause the first transmission path 70A to transmit a first wireless signal having a frequency within the first carrier 72A by causing the first LO 82A to generate an output signal having the frequency of the first carrier 72A, which is then mixed, via the mixer 80A to an input signal. Similarly, the processor 12 may cause the second transmission path 70B to transmit a second wireless signal having a frequency within the second carrier 72B by causing the second LO 82B to generate an output signal having the frequency of the second carrier 72B, which is then mixed, via the mixer 80B to an input signal.

Due to the architecture shown in FIG. 4, because there are only two transmission paths 70A, 70B, uplink MIMO may not be supported by intra-band non-contiguous uplink carrier aggregation. That is, because frequency separation between two non-contiguous uplink carriers (e.g., 72A, 72B) in the same frequency band may be excessive (e.g., greater than a threshold frequency separation, such as greater than 100 megahertz (MHz), greater than 200 MHz, greater than 300 MHz, greater than 600 MHz, and so on), channel or propagation conditions may be different between the first carrier 72A and the second carrier 72B. This may result frequency selective fading, where the first carrier 72A may fade more than the second carrier 72B, or vice versa. Accordingly, the disclosed embodiments provide dynamic uplink transmission switching to select transmission using either the first carrier 72A or the second carrier 72B in the same frequency band based on whichever carrier 72A, 72B exhibits better channel conditions (e.g., signal quality, signal power).

While, in some embodiments, it may be possible to transmit using both carriers 72A, 72B simultaneously or concurrently (e.g., using the first transmission path 70A via the first carrier 72A and the second transmission path 70B via the second carrier 72B) as described above, such transmission may generate intermodulation products (e.g., of the $3^{rd}$ order, of the $5^{th}$ order, and the like) that may exceed an out-of-band emission limit. To ensure that the intermodulation products do not exceed the emission limit, the processor 12 may decrease or reduce transmission power (e.g., apply a maximum power reduction or additional-maximum power reduction) to transmission power to the power amplifiers 78A, 78B on the first and second transmission paths 70A, 70B, thus decreasing or reducing range of transmission signals from the user equipment 10 and/or communication performance.

Providing dynamic uplink transmission switching to select transmission using either the first carrier 72A or the second carrier 72B in the same frequency band, as disclosed, avoids generating the intermodulation products, thus enabling an increased, maximized, or optimized transmission power of the power amplifiers 78A, 78B on the first and second transmission paths 70A, 70B, thus enabling increasing or maximizing the range of transmission signals from the user equipment 10 and/or communication performance. Moreover, performing uplink MIMO (e.g., transmitting multiple wireless signals on both transmission paths 70A, 70B using the same component carrier 72A, 72B) may double the capacity or throughput of the component carrier 72A, 72B without using carrier aggregation, and avoid applying a maximum power reduction or additional-maximum power reduction due to reducing a likelihood of or altogether eliminating generating an intermodulation product. Advantageously, the user equipment 10 may use the same radio resource control (RRC) configuration (e.g., not require RRC reconfiguration) when switching between the two carriers 72A, 72B, since there may be no change in primary cell and/or secondary cell designation. Indeed, the primary cell may be turned off while using the secondary cell to transmit quickly with little to no interruption to communication. It should be understood that, while the disclosure discusses switching between two uplink carriers 72A, 72B on two transmission paths 70A, 70B, similar concepts may be applied to more than two carriers on more than two transmission paths.

Figures 6, 7:
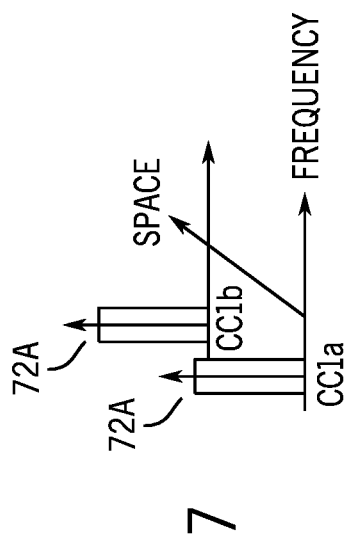
FIG. 6 is a schematic diagram of the first and second transmission paths of FIG. 4 using the first component carrier at a first time, according to embodiments of the present disclosure.
FIG. 7 is a frequency diagram illustrating the first component carrier of FIG. 6 at different points in space, according to embodiments of the present disclosure.

FIG. 6 is a schematic diagram of the first and second transmission paths 70A, 70B using the first component carrier 72A at a first time $t_1$, according to embodiments of the present disclosure. As illustrated, the processor 12 couples the LO 82A that is generating the local oscillation signal LO1 having a frequency of within the first carrier 72A (CC1) to both the first transmission path 70A and the second transmission path 70B. The first transmission path 70A is shown to transmit a signal in the first carrier 72A at the first antenna 55A, and, as such, the first carrier 72A at this first point in space corresponding to the first antenna 55A may be referred to as CC1$a$ (72A). Similarly, the second transmission path 70B is shown to transmit a signal in the first carrier 72A at the second antenna 55B, and, as such, the first carrier 72A at this second point in space corresponding to the second antenna 55B may be referred to as CC1*b* (72A). This procedure is an example of performing uplink MIMO using the first carrier 72A.

FIG. 7 is a frequency diagram illustrating the first component carrier 72A at different points in space, according to embodiments of the present disclosure. Each point in space corresponds to a different antenna (e.g., 55A, 55B). As illustrated, the first component carrier 72A at a first point in space corresponding to the first antenna 55A is referred to as CC1*a* (72A), and the first component carrier 72A at a second point in space corresponding to the second antenna 55B is referred to as CC1*b* (72A).

Figures 8, 9:
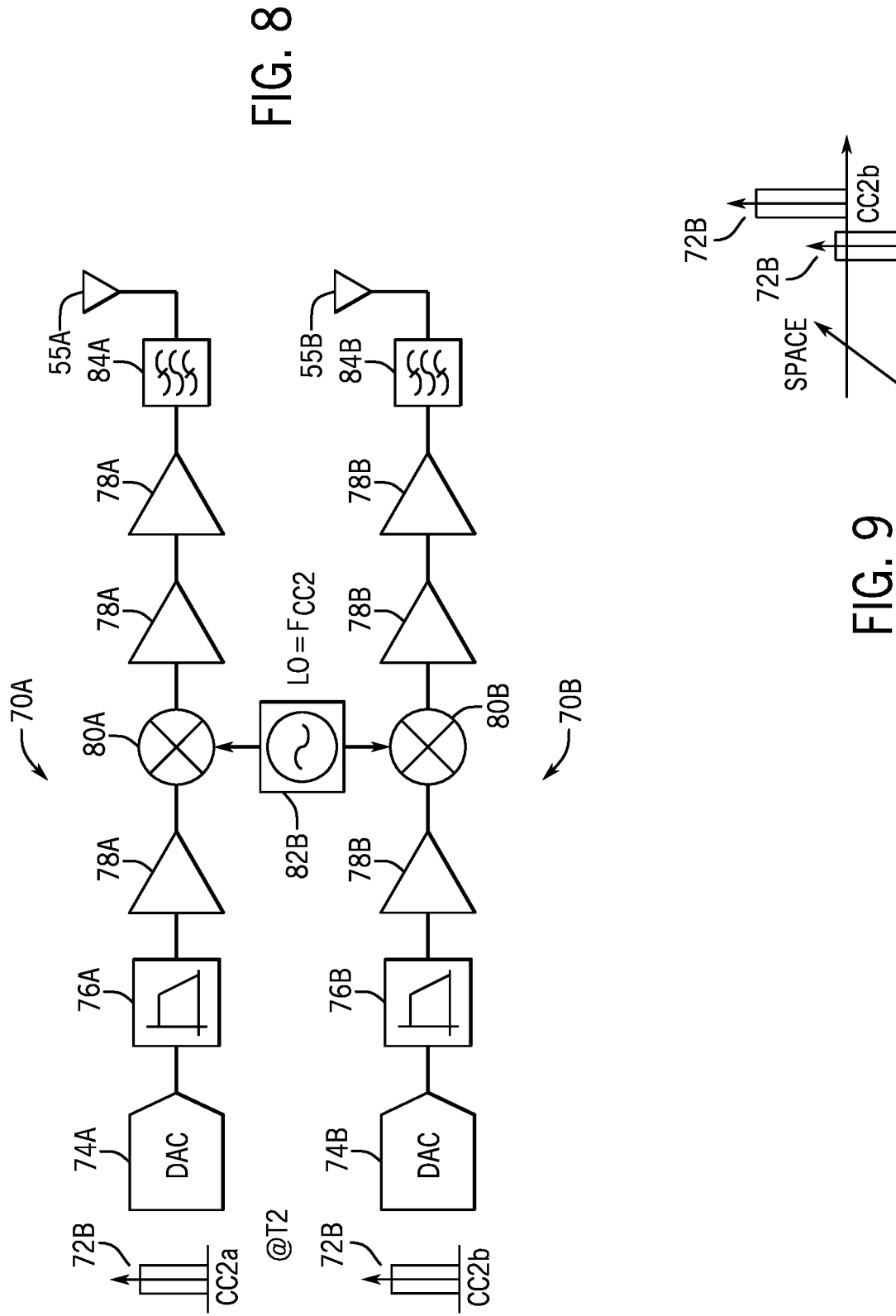
FIG. 8 is a schematic diagram of the first and second transmission paths of FIG. 4 using the second component carrier at a second time, according to embodiments of the present disclosure.
FIG. 9 is a frequency diagram illustrating the second component carrier of FIG. 8 at different points in space, according to embodiments of the present disclosure.

FIG. 8 is a schematic diagram of the first and second transmission paths 70A, 70B using the second component carrier 72B at a second time $t_2$, according to embodiments of the present disclosure. As illustrated, the processor 12 couples the LO 82B that is generating the local oscillation signal LO2 having a frequency of within the second carrier 72B (CC1) to both the first transmission path 70A and the second transmission path 70B, where the second carrier 72B is in a same frequency band as the first carrier 72A from FIGS. 6 and 7. The first transmission path 70A is shown to transmit a signal in the second carrier 72B at the first antenna 55A, and, as such, the second carrier 72B at this first point in space corresponding to the first antenna 55A may be referred to as CC2*a* (72A). Similarly, the second transmission path 70B is shown to transmit a signal in the second carrier 72B at the second antenna 55B, and, as such, the second carrier 72B at this second point in space corresponding to the second antenna 55B may be referred to as CC2*b* (72A). This procedure is an example of performing uplink MIMO using the second carrier 72B.

FIG. 9 is a frequency diagram illustrating the second component carrier 72B at different points in space, according to embodiments of the present disclosure. Each point in space corresponds to a different antenna (e.g., 55A, 55B). As illustrated, the second component carrier 72B at a first point in space corresponding to the first antenna 55A is referred to as CC2*a* (72B), and the second component carrier 72B at a second point in space corresponding to the second antenna 55B is referred to as CC2*b* (72B).

As an example of operation, in a first scenario, the network 62 may schedule the user equipment 10 to transmit using the first transmission path 70A on the first carrier 72A and using the second transmission path 70B on the second carrier 72B at a first time, and switch to transmitting using both the first and second transmission paths 70A, 70B on the second carrier 72B at a second time (and not transmitting on the first carrier at the second time). In a second scenario, the network 62 may schedule the user equipment 10 to transmit using the first transmission path on the first carrier at a first time (and not transmitting on the second transmission path of the first carrier at the first time), and switch to transmitting using both the first and second transmission paths on the second carrier at a second time (and not transmitting on the first carrier at the second time). In any case, the user equipment 10 may be limited to transmission on the two transmission paths, though performing simultaneous transmission on the two transmission paths may improve coverage, uplink throughput, and latency.

As such, if link budget permits, as determined by the network 62, uplink MIMO may be scheduled to both carriers 72A, 72B, though it is contemplated that uplink MIMO be scheduled to neither or only one carrier 72A, 72B. In some cases, the user equipment 10 may include a single LO (e.g., 82A) that generates the first frequency of the first carrier 72A that the processor 12 couples to the first transmission path 70A when transmitting using the first transmission path 70A, couples to the second transmission path 70B when transmitting using the second transmission path 70B, and couples to both the first and second transmission paths 70A, 70B when performing uplink MIMO. When scheduled to transmit using the second carrier 72B, the processor 12 may cause the LO 82A to generate the second frequency of the second carrier 72B, and couple the LO 82A to the first transmission path 70A when transmitting using the first transmission path 70A, couple the LO 82A to the second transmission path 70B when transmitting using the second transmission path 70B, and couple the LO 82A to both the first and second transmission paths 70A, 70B when performing uplink MIMO. FIGS. 6 and 8 illustrate such a configuration, where the LOs 82A, 82B may represent a single LO (e.g., 82A).

Figure 10:
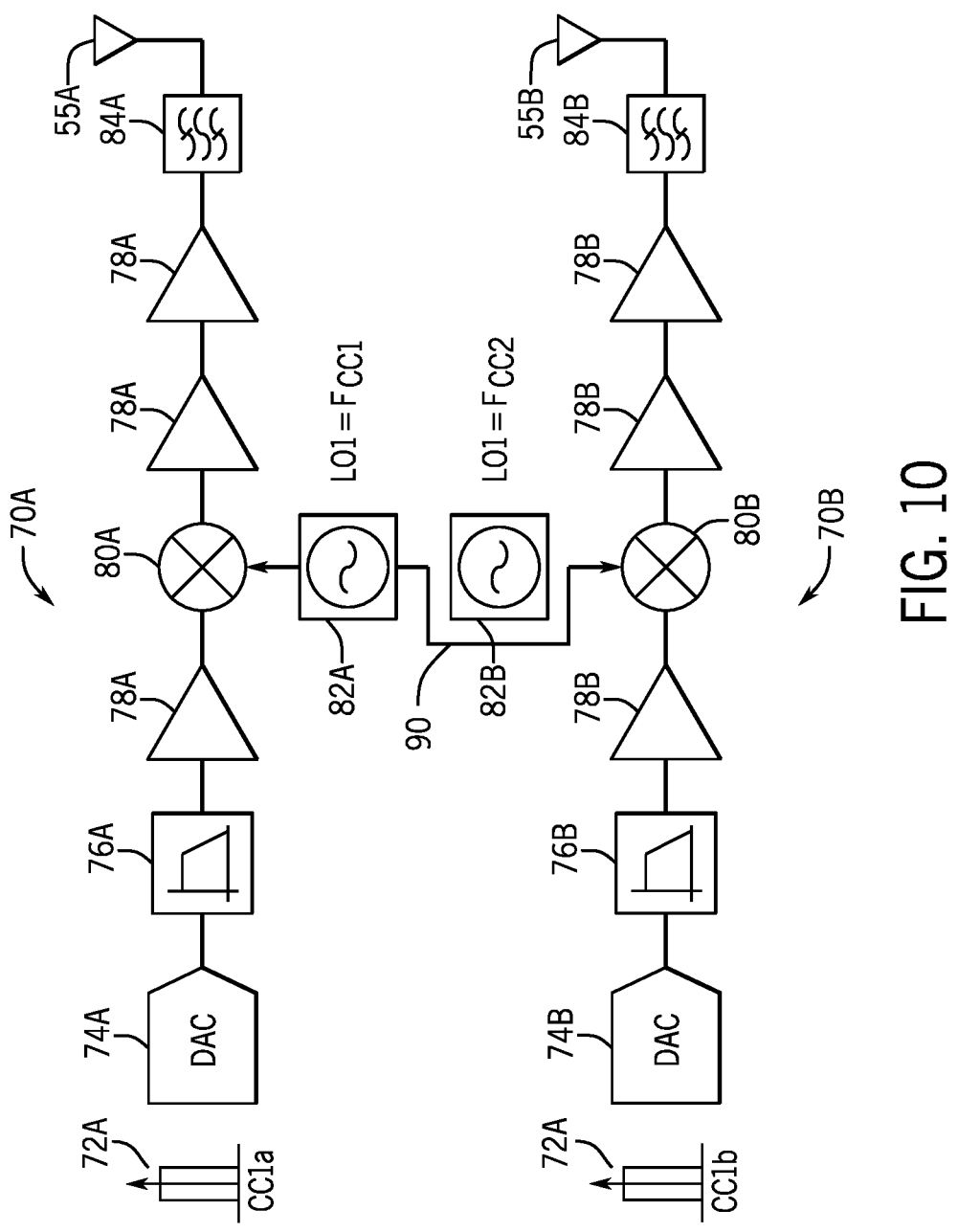
FIG. 10 is a schematic diagram of the first and second transmission paths of FIG. 4 that are configured to couple to a first local oscillator and a second local oscillator, according to embodiments of the present disclosure.

Additionally or alternatively, as shown in the schematic diagram of FIG. 10, the user equipment 10 may include a first LO 82A that generates the first frequency of the first carrier 72A that the processor 12 couples to the first transmission path 70A when transmitting using the first transmission path 70A, couples to the second transmission path 70B when transmitting using the second transmission path 70B, and couples to both the first and second transmission paths 70A, 70B when performing uplink MIMO. When scheduled to transmit using the second carrier 72B, the processor 12 may cause the second LO 82B to generate the second frequency of the second carrier 72B, and couple the second LO 82B to the first transmission path 70A when transmitting using the first transmission path 70A, second LO 82B to the second transmission path 70B when transmitting using the second transmission path 70B, and second LO 82B to both the first and second transmission paths 70A, 70B when performing uplink MIMO. As illustrated, a first path 90 couples the first LO 82A to (and uncouples the second LO 82 from) both the first and second transmission paths 70A, 70B to perform uplink MIMO on the first carrier 72A. When performing uplink MIMO on the second carrier 72B, a second path that couples the second LO 82B to (and uncouples the first LO 82A from) may be activated. In some embodiments, the processor 12 may use switching circuitry to switch between the first path 90 and the second path. It should be understood that different switching times may correspond to different numbers of LOs 82A, 82B. That is, use of a single LO (e.g., 82A) may include longer switching time than use of more LOs (e.g., 82A, 82B), due to, when using multiple LOs 82A, 82B, while the first LO 82A is providing a desired frequency to the two transmission paths 70A, 70B, the second LO 82B may be set to the next desired frequency, thus reducing LO 82A, 82B setting time.

FIG. 11 is a flowchart of a process 100 for uplink transmission switching between the first and second component carriers 72A, 72B allocated in an intra-band non-contiguous uplink carrier aggregation scheme, according to embodiments of the present disclosure. Any suitable device (e.g., a controller) that may control components of the user equipment 10, the base station 64, and/or the network 62, such as the processor 12, may perform the process 100. In some embodiments, the process 100 may be implemented by executing instructions stored in a tangible, non-transitory, computer-readable medium, such as the memory 14 or storage 16, using the processor 12. For example, the process 100 may be performed at least in part by one or more software components, such as an operating system of the user equipment 10, the base station 64, and/or the network 62, one or more software applications of the user equipment 10, the base station 64, and/or the network 62, and the like.

While the process 100 is described using steps in a specific sequence, it should be understood that the present disclosure contemplates that the described steps may be performed in different sequences than the sequence illustrated, and certain described steps may be skipped or not performed altogether.

In process block 102, the network 62 allocates first and second component carriers 72A, 72B in the same frequency band to the user equipment 10. For example, the network 62 may transmit, via the base station 64, an indication of the allocated first and second component carriers 72A, 72B to the user equipment 10. In process block 104, the user equipment 10 receives an indication of the allocated first and second component carriers 72A, 72B. In process block 106, the network 62 schedules the first carrier 72A to the user equipment 10 for uplink MIMO. Additionally or alternatively, the network 62 may schedule the first carrier 72A to the user equipment 10 to use only one transmission path (e.g., the first transmission path 70A).

In process block 108, the user equipment 10 sets the first LO 82A to a first frequency within or of the first carrier 72A. In process block 110, the user equipment 10 operatively couples the first LO 82A to the transmission paths 70A, 70B. When the network 62 schedules the first carrier 72A to the user equipment 10 to use only one transmission path (e.g., the first transmission path 70A), then the user equipment 10 operatively couples the first LO 82A, but not the second LO 82B (or any other LO) to the first transmission path 70A. In process block 112, the user equipment 10 sends a first set of wireless signals (e.g., one or more wireless signals) on the two transmission paths 70A, 70B. For example, the user equipment 10 may perform uplink MIMO on the first carrier 72A by sending a first wireless signal to the base station 64 on the first transmission path 70A via the first antenna 55A and a second wireless signal to the base station 64 on the second transmission path 70B via the second antenna 55B. When the network 62 schedules the first carrier 72A to the user equipment 10 to use only one transmission path (e.g., the first transmission path 70A), then the user equipment 10 may send the first wireless signal to the base station 64 on the first transmission path 70A via the first antenna 55A, but not send the second wireless signal using the second transmission path 70B.

In process block 114, the network 62 receives the first set of wireless signals (e.g., at an antenna of the base station 64). The base station 64 and/or the network 62 may then decode the wireless signals by performing any suitable MIMO decoding algorithm or technique to separate the wireless signals and process the separated wireless signals.

In process block 116, the network 62 schedules the second carrier 72B to the user equipment 10 for uplink MIMO. Additionally or alternatively, the network 62 may schedule second first carrier 72B to the user equipment 10 to use only one transmission path (e.g., the second transmission path 70B). In process block 118, the user equipment 10 sets the first LO 82A (e.g., when using a single LO, such as when the LO 82A of FIG. 6 is the same as the LO 82B of FIG. 8) or the second LO 82B (e.g., when using multiple LOs as shown in FIG. 10) to a second frequency within or of the second carrier 72B.

In process block 120, the user equipment 10 operatively couples the first LO 82A (e.g., when using the single LO) or the second LO 82B (e.g., when using multiple LOs) to the transmission paths 70A, 70B. When using the multiple LOs 82A, 82B, the processor 12 of the user equipment 10 may uncouple the first LO 82A from the transmission paths 70A, 70B, and couple the second LO 82B to the transmission paths 70A, 70B (e.g., using switching circuitry that selectively couples the first LO 82A to the transmission paths 70A, 70B, and the second LO 82B to the transmission paths 70A, 70B).

Additionally or alternative, when the network 62 schedules the second carrier 72B to the user equipment 10 to use only one transmission path (e.g., the second transmission path 70B), then the user equipment 10 operatively couples the second LO 82B, but not the first LO 82A (or any other LO) to the second transmission path 70B. In process block 122, the user equipment 10 sends a second set of wireless signals (e.g., one or more wireless signals) on the two transmission paths 70A, 70B. For example, the user equipment 10 may perform uplink MIMO on the second carrier 72B by sending a third wireless signal to the base station 64 on the first transmission path 70A via the first antenna 55A and a fourth wireless signal to the base station 64 on the second transmission path 70B via the second antenna 55B. When the network 62 schedules the second carrier 72B to the user equipment 10 to use only one transmission path, then the user equipment 10 may send the third wireless signal to the base station 64 on the first transmission path 70A via the first antenna 55A, but not send the fourth wireless signal using the second transmission path 70B.

In process block 124, the network 62 receives the second set of wireless signals (e.g., at an antenna of the base station 64). The base station 64 and/or the network 62 may then decode the wireless signals by performing any suitable MIMO decoding algorithm or technique to separate the wireless signals and process the separated wireless signals. In this manner, the process 100 enables uplink transmission switching between the first and second component carriers 72A, 72B allocated in an intra-band noncontiguous uplink carrier aggregation scheme.

It should be understood that the disclosure enables switching between two intra-band carriers 72A, 72B using any suitable number of transmission paths 70A, 70B. For example, the switching may occur between transmitting using a first transmission path (e.g., 70A, 70B) on the first carrier 72A and transmitting using a second (e.g., same or different) transmission path (e.g., 70A, 70B) on the second carrier 72B, transmitting using the first transmission path (e.g., 70A, 70B) on the first carrier 72A and transmitting using the first and second transmission paths 70A, 70B on the second carrier 72B, transmitting using the first and second transmission paths 70A, 70B on the first carrier 72A and transmitting using the first transmission path (e.g., 70A, 70B) on the second carrier 72B, transmitting using the first and second transmission paths 70A, 70B on the first carrier 72A and transmitting using the first and second transmission paths 70A, 70B on the second carrier 72B, and so on. Transmitting on one transmission path (e.g., 70A, 70B) may refer to non-MIMO transmission, as opposed to transmitting on multiple transmission paths (e.g., 70A, 70B), which may be referred to as MIMO transmission.

Moreover, the disclosed uplink transmission switching for intra-band non-contiguous uplink carrier aggregation may also be combined with inter-band uplink carrier aggregation, where switching may be performed among three uplink carriers, four uplink carriers, or even more. For example, switching may be performed among, as defined by the 3GPP, a carrier aggregation combination of frequency band n41 with one carrier and frequency band n77 with two carriers, a carrier aggregation combination of frequency band n41 with two carriers and frequency band n77 with one carrier, a carrier aggregation combination of frequency band n41 with two carriers and frequency band n77 with two carriers, and so on. When combining the disclosed uplink transmission switching for intra-band non-contiguous uplink carrier aggregation with inter-band uplink carrier aggregation, there may be up to two uplink carriers with simultaneous transmission, though the disclosure may apply to any suitable number of uplink carriers.

In some embodiments, the user equipment 10 may indicate a reporting capability (e.g., to the network 62 via the base station 64) to indicate whether it supports dynamic uplink transmission switching across a pair of non-contiguous carriers 72A, 72B within a frequency band. The indication may include a "switchedUL" field that indicates that no simultaneous operation may be performed on the indicated pair of carriers 72A, 72B with a frequency band, and/or a "dualUL" field that indicates that simultaneous operation may be performed on the indicated pair of carriers 72A, 72B with the frequency band.

Additionally or alternatively, the user equipment 10 may indicate one or more values of switching period for a pair of non-contiguous carriers 72A, 72B within a frequency band, including a switching period value for the pair of carriers 72A, 72B for switching between transmitting using one transmission path (e.g., 70A, 70B) on the first carrier 72A and transmitting using the two transmission paths 70A, 70B on the second carrier 72B, and/or a switching period value for the pair of carriers 72A, 72B for switching between transmitting using the two transmission paths 70A, 70B on the first carrier 72A and transmitting using the two transmission paths 70A, 70B on second carrier 72B.

In some embodiments, the user equipment 10 may indicate a frequency band combination with up to N (e.g., any suitable number of) frequency bands for which dynamic uplink transmission switching is supported. Additionally, the user equipment 10 may also indicate non-contiguous carriers 72A, 72B within each frequency band of the frequency band combination for which dynamic uplink transmission switching is supported. The total number of non-contiguous carriers (e.g., 72A, 72B) may be limited by M (e.g., any suitable limiting number). In one implementation, if N=2 and M=4, then the user equipment 10 may report a frequency band combination of frequency band A and frequency band B {A, B}, and/or report (e.g., to the network 62 via the base station 64) a combination of carriers for the frequency bands within a frequency band combination such that the total number of carriers is four, including, for example, a carrier combination of {A1, A2, B1, B2}, a carrier combination of {A1, A2, A3, B1}, a carrier combination of {A1, B1, B2, B3}, and so on. In another implementation, if N=3 and M=4, then the user equipment 10 may report a frequency band combination of frequency band A, frequency band B, and frequency band C {A, B, C}, and/or report (e.g., to the network 62 via the base station 64) a combination of carriers for the frequency bands within a frequency band combination such that the total number of carriers is four, including, for example, a carrier combination of {A1, A2, B, C}, a carrier combination of {A, B1, B2, C}, a carrier combination of {A, B, C1, C2}, and so on. In yet another implementation, if N=4 and M=5, then the user equipment 10 may report a frequency band combination of frequency band A, frequency band B, frequency band C, and frequency band D {A, B, C, D}, and/or report (e.g., to the network 62 via the base station 64) a combination of carriers for the frequency bands within a frequency band combination such that the total number of carriers is five, including, for example, a carrier combination of {A1, A2, B, C, D}, a carrier combination of {A, B1, B2, C, D}, a carrier combination of {A, B, C1, C2, D}, a carrier combination of {A, B, C, D1, D2}, and so on. In another implementation, if N=3 and M=5, then the user equipment

10 may report a frequency band combination of frequency band A, frequency band B, and frequency band C {A, B, C}, and/or report (e.g., to the network 62 via the base station 64) a combination of carriers for the frequency bands within a frequency band combination such that the total number of carriers is five, including, for example, a carrier combination of {A1, A2, B1, B2, C}, a carrier combination of {A, B1, B2, C1, C2}, a carrier combination of {A1, A2, B, C1, C2}, and so on.

In the discussed implementations, the user equipment 10 may additionally or alternatively report (e.g., to the network 62 via the base station 64), for each carrier combination, switching modes that the carrier combination supports and/ or one or more switching periods the carrier combination supports. In some embodiments, the user equipment 10 report a number of frequency bands among the frequency band combination that may support dynamic uplink transmission switching across non-contiguous intra-band carriers, and/or a number of non-contiguous intra-band carriers within a frequency band for which dynamic uplink transmission switching may be performed.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The invention claimed is:

1. A method comprising:
receiving a first indication of a first carrier and a second carrier in a same frequency band;
configuring a first local oscillator to generate a first frequency of the first carrier;
transmitting a first set of signals using a plurality of transmission paths using the first carrier;
configuring the first local oscillator or a second local oscillator to generate a second frequency of the second carrier;
transmitting a second indication of a switching period associated with the first carrier, the second carrier, or both; and
transmitting a second set of signals using the plurality of transmission paths using the second carrier based on the switching period.

2. The method of claim 1, wherein the first indication indicates non-contiguous uplink carrier aggregation.

3. The method of claim 1, wherein the first indication indicates a third carrier in a different frequency band.

4. The method of claim 3, comprising configuring the first local oscillator to generate a third frequency of the third carrier, and transmitting a third set of signals using a transmission path of the plurality of transmission paths using the third carrier.

5. The method of claim 4, wherein transmitting the third set of signals occurs using a same radio resource control configuration as transmitting the first set of signals and the second set of signals.

6. The method of claim 1, comprising receiving a third indication to schedule the first carrier for uplink multiple-in and multiple-out transmission.

7. The method of claim 6, comprising receiving a fourth indication to schedule the second carrier for uplink multiple-in and multiple-out transmission.

8. The method of claim 1, comprising coupling the first local oscillator to the plurality of transmission paths.

9. The method of claim 8, comprising configuring the first local oscillator to generate the second frequency.

10. The method of claim 8, comprising uncoupling the first local oscillator from the plurality of transmission paths, and coupling the second local oscillator to the plurality of transmission paths.

11. User equipment comprising:
a first transmission path comprising a first mixer;
a second transmission path comprising a second mixer;
a local oscillator coupled to the first mixer and the second mixer; and
processing circuitry coupled to the first transmission path, the second transmission path, and the local oscillator, the processing circuitry configured to
    receive a first indication of a first carrier and a second carrier in a same frequency band,
    cause a transmitter to transmit a second indication of a switching period associated with the first carrier, the second carrier, or both,
    configure the local oscillator to generate a first frequency of the first carrier,
    cause the transmitter to transmit a first signal using the first transmission path and the first carrier,
    cause the transmitter to transmit a second signal using the second transmission path and the first carrier,
    cause the transmitter to transmit a third signal using the first transmission path and the second carrier based on the switching period, and cause the transmitter to transmit a fourth signal using the second transmission path and the second carrier.

12. The user equipment of claim 11, wherein the processing circuitry configured to configure the local oscillator to generate a second frequency of the second carrier.

13. The user equipment of claim 11, comprising an additional local oscillator, the processing circuitry being configured to configure the additional local oscillator to generate a second frequency of the second carrier.

14. The user equipment of claim 11, wherein the first indication indicates a third carrier in a different frequency band.

15. Tangible, non-transitory, computer-readable media, storing instructions that cause processing circuitry to:
allocate a first carrier and a second carrier in a same frequency band to user equipment;
receive an indication from the user equipment comprising a switching period associated with the first carrier, the second carrier, or both;
schedule the user equipment to use the first carrier to transmit a first plurality of signals using a plurality of antennas;
receive the first plurality of signals;
schedule the user equipment to use the second carrier to transmit a second plurality of signals using the plurality of antennas based on the switching period; and
receive the second plurality of signals.

16. The tangible, non-transitory, computer-readable media of claim 15, wherein the instructions cause the processing circuitry to allocate a third carrier in a different frequency band to the user equipment.

17. The tangible, non-transitory, computer-readable media of claim 16, wherein the instructions cause the processing circuitry to schedule the user equipment to use the third carrier to transmit a third plurality of signals using the plurality of antennas.

18. The tangible, non-transitory, computer-readable media of claim 17, wherein the instructions cause the processing circuitry to establish a radio resource control configuration for the user equipment to transmit the first plurality of signals, the second plurality of signals, and the third plurality of signals.

19. The tangible, non-transitory, computer-readable media of claim 15, wherein the instructions cause the processing circuitry to spatially decode each signal from the first plurality of signals.

20. The tangible, non-transitory, computer-readable media of claim 15, wherein the first carrier and the second carrier are non-contiguous.

* * * * *